(12) United States Patent
Gao et al.

(10) Patent No.: US 11,146,200 B2
(45) Date of Patent: Oct. 12, 2021

(54) VARIABLE FREQUENCY INDEPENDENT SPEED MOTOR CONTROL BASED ON FLUX ESTIMATE

(71) Applicant: The Boeing Company, Chicago, IL (US)

(72) Inventors: Lijun Gao, Renton, WA (US); Shengyi Liu, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 38 days.

(21) Appl. No.: 16/814,043

(22) Filed: Mar. 10, 2020

(65) Prior Publication Data

US 2021/0288603 A1 Sep. 16, 2021

(51) Int. Cl.
*H02P 6/28* (2016.01)
*H02P 27/04* (2016.01)
*H02P 23/14* (2006.01)
*H02P 21/28* (2016.01)

(52) U.S. Cl.
CPC ............ *H02P 27/047* (2013.01); *H02P 21/28* (2016.02); *H02P 23/14* (2013.01)

(58) Field of Classification Search
CPC .......... H02P 6/28; H02P 27/047; H02P 21/28; H02P 23/14
See application file for complete search history.

(56) References Cited

U.S. PATENT DOCUMENTS

| | | |
|---|---|---|
| 4,443,748 A | 4/1984 | Boev et al. |
| 4,625,160 A | 11/1986 | Hucker |
| 5,083,039 A * | 1/1992 | Richardson ........... F03D 7/0272 290/44 |
| 8,963,476 B2 | 2/2015 | Illiano |
| 9,673,743 B1 | 6/2017 | Billson et al. |
| 2003/0071596 A1 | 4/2003 | Gokhale et al. |
| 2007/0222220 A1 | 9/2007 | Huang et al. |

(Continued)

OTHER PUBLICATIONS

Fuchs, F., "A New Control Method for AC Drives with Inverter-Fed Synchronous Machines Supplied from a Battery." Sep. 12, 1983, IFAC Control in Power Electronics and Electrical Drives, Lausanne, Switzerland, pp. 603-609. Sep. 13, 1983.

(Continued)

*Primary Examiner* — Cortez M Cook
(74) *Attorney, Agent, or Firm* — Parsons Behle & Latimer (57) ABSTRACT

A system for controlling a motor may include an alternating current (AC) bus configured to transmit an AC power signal to a set of stator windings, where the AC power signal produces a first rotating magnetic flux at the set of stator windings. The system may also include a high frequency contactless transformer configured to transmit an excitation signal to a set of rotor windings, where the excitation signal produces a second rotating magnetic flux at the rotor. The system may also include electrical circuitry configured to determine a rotor voltage and a rotor current associated with the excitation signal, determine a rotor flux magnitude estimate and a rotor flux angle estimate based on the rotor voltage and the rotor current, and determine an inverter control signal operable to generate the excitation signal based at least partially on the rotor flux magnitude estimate and the rotor flux angle estimate.

20 Claims, 5 Drawing Sheets

(56) References Cited

U.S. PATENT DOCUMENTS

| | | |
|---|---|---|
| 2013/0057195 A1 | 3/2013 | Ha et al. |
| 2014/0042953 A1 | 2/2014 | Sul et al. |
| 2015/0035469 A1 | 2/2015 | Rozman et al. |
| 2015/0115762 A1 | 4/2015 | Rozman et al. |
| 2016/0094114 A1 | 3/2016 | Gao et al. |
| 2016/0173018 A1* | 6/2016 | Nondahl ............... H02P 6/28 318/400.02 |
| 2016/0301333 A1 | 10/2016 | Rozman et al. |
| 2017/0063192 A1 | 3/2017 | Kuznetsov |

OTHER PUBLICATIONS

Emojong, E., "Design of Inverter Drive for AC Induction Motor," May 20, 2009.

US Patent and Trademark Office; Office Action for U.S. Appl. No. 15/982,470 dated Jun. 6, 2019.

European Patent Office; European Search Report for Application No. 19169465.2 dated Oct. 22, 2019.

European Patent Office; Office Action for Application No. 19169465.2 dated Nov. 5, 2019.

\* cited by examiner

VARIABLE FREQUENCY INDEPENDENT SPEED MOTOR CONTROL BASED ON FLUX ESTIMATE

FIELD OF THE DISCLOSURE

This disclosure is generally related to the field of variable frequency independent speed motor control and, in particular, to control using a direct torque control process based on both a rotor and stator flux estimate.

BACKGROUND

In a typical synchronous alternating current (AC) motor, an AC power signal may be applied to stator windings of the AC motor to generate a rotating magnetic flux. The rotating magnetic flux may interact with a magnetic field of a rotor (generated by either permanent magnets or electromagnets) to cause the rotor to turn. Thus, a speed of a typical synchronous AC motor is dependent on a frequency of the AC power signal. In order to change the speed of a typical AC motor, a frequency of the AC power signal applied to the stator windings may be altered (e.g., using a variable frequency drive).

Variable frequency independent speed (VFIS) motors are a type of multiphase motor that can be operated at speeds that are independent from the frequency of the AC power signal applied to the stator windings. VFIS motors operate by transmitting an excitation signal from the stator to the rotor using a high frequency contactless transformer. The excitation signal is applied to a set of rotor windings to create a rotating magnetic flux at the rotor, which may add to, or offset, the rotating magnetic flux produced at the stator windings. By controlling the excitation signal, the speed of the VFIS motor may be controlled independently from the frequency of the AC power signal.

Direct torque control is a method that may be used to control the speed of typical AC motors. A typical direct torque control method includes measuring a voltage and a current of the AC power signal applied to the stator. The measurements may be used to estimate a flux magnitude and torque associated with the motor. Based on the estimates, a variable frequency drive may be used to control the AC power signal (e.g., using a variable frequency drive) in order to efficiently produce a desired speed output of the motor.

VFIS motors are different that typical AC motors because they may not achieve speed independence by altering the AC power signal applied to the set of stator windings. Therefore, typical direct torque control methods (which function by altering the AC power signal applied to the stator windings) may be insufficient to drive VFIS motors. Further, because the torque associated with a VFIS motor is determined by both the AC power signal applied to the stator windings and by the excitation signal applied to the rotor windings, typical direct torque control methods (which rely on measurements of the AC power signal alone to estimate torque) may not be sufficient to estimate the torque associated with a VFIS motor. Other disadvantages may exist.

SUMMARY

Disclosed are systems and methods that address at least one of the disadvantages described above. In an example, a system includes a motor having a stator, a rotor, a set of stator windings, and a set of rotor winding. The system includes an AC bus configured to transmit an AC power signal to the set of stator windings. The AC power signal produces a first rotating magnetic flux at the set of stator windings. The system further includes a high frequency contactless transformer configured to transmit an excitation signal from the stator to the rotor, where the excitation signal is received at the set of rotor windings. The excitation signal produces a second rotating magnetic flux at the rotor. The system also includes electrical circuitry configured to determine a rotor voltage and a rotor current associated with the excitation signal, determine a rotor flux magnitude estimate and a rotor flux angle estimate based on the rotor voltage and the rotor current, and determine an inverter control signal operable to generate the excitation signal based at least partially on the rotor flux magnitude estimate and the rotor flux angle estimate.

In some examples, the electrical circuitry is further configured to determine a stator voltage and a stator current associated with the AC power signal, determine a stator flux magnitude estimate and a stator flux angle estimate based on the stator voltage and the stator current, and determine a phase angle difference based on the rotor flux angle estimate, a rotor shaft angle, and the stator flux angle estimate, where the inverter control signal is further based at least partially on the phase angle difference. In some examples, the electrical circuitry is also configured to determine a torque estimation based on the rotor flux magnitude estimate, the stator flux magnitude estimate, and the phase angle difference, where the inverter control signal is further based at least partially on the torque estimation. In some examples, the electrical circuitry is configured to determine a reference rotor flux angle by offsetting a difference between the stator flux angle estimate and the rotor shaft angle by 90 degrees, where the inverter control signal is further based at least partially on the reference rotor flux angle.

In some example, the electrical circuitry is further configured to determine a flux lookup value based on a difference between a reference rotor flux magnitude and the rotor flux magnitude estimation, determine a torque lookup value based on a difference between a reference torque and the torque estimation, determine a sector lookup value based on the reference rotor flux angle, where the inverter control signal is determined by using a lookup table with the flux lookup value, the torque lookup value, and the sector lookup value as inputs. In some examples, the electrical circuitry is further configured to determine the reference torque based on a difference between a reference shaft speed and a rotor shaft speed.

In some examples, the system includes a DC bus and a 3-phase inverter for generating the excitation signal using a direct current (DC) power signal received from the DC bus. In some examples, the electrical circuitry implements a controller that includes at least one processor and memory, where the memory stores instructions that are executable by the at least one processor, where determining the rotor flux magnitude estimate and the rotor flux angle estimate, determining a stator flux magnitude estimate and a stator flux angle estimate, determining a phase angle difference, determining a torque estimation, determine a reference rotor flux angle, determining a flux lookup value, determine a torque lookup value, determine a sector lookup value, and determining the inverter control signal operable to generate the excitation signal is performed at the processor. In some examples, the motor, the AC bus, a DC bus, the high frequency contactless transformer, and the electrical circuitry are incorporated into a vehicle.

In an example, a method includes transmitting an AC power signal from an AC bus to a set of stator windings at a stator of a motor, where the AC power signal produces a first rotating magnetic flux at the set of stator windings. The method further includes transmitting an excitation signal from the stator to a set of rotor windings at a rotor of the motor via a high frequency contactless transformer, where the excitation signal produces a second rotating magnetic flux at the rotor. The method also includes determining a rotor voltage and a rotor current associated with the excitation signal. The method includes determining a rotor flux magnitude estimate and a rotor flux angle estimate based on the rotor voltage and the rotor current. The method further includes determining an inverter control signal operable to generate the excitation signal based at least partially on the rotor flux magnitude estimate and the rotor flux angle estimate. The method also includes sending the inverter control signal to an inverter and generating the excitation signal at the inverter.

In some examples, the method includes determining a stator voltage and a stator current associated with the AC power signal, determining a stator flux magnitude estimate and a stator flux angle estimate based on the stator voltage and the stator current, and determining a phase angle difference based on the rotor flux angle estimate, a rotor shaft angle, and the stator flux angle estimate, where the inverter control signal is further based at least partially on the phase angle difference. In some examples, the method includes determining a torque estimation based on the rotor flux magnitude estimate, the stator flux magnitude estimate, and the phase angle difference, where the inverter control signal is further based at least partially on the torque estimation.

In some examples, the method includes determining a reference rotor flux angle by offsetting a difference between the estimated stator flux angle and the rotor shaft angle by 90 degrees. In some examples, the method includes determining a flux lookup value based on a difference between a reference rotor flux magnitude and the rotor flux magnitude estimate, determining a torque lookup value based on a difference between a reference torque and the torque estimation, and determining a sector lookup value based on the reference rotor flux angle, where the inverter control signal is determined by using a lookup table with the flux lookup value, the torque lookup value, and the sector lookup value as inputs.

In some examples, the method includes determining the reference torque based on a difference between a reference shaft speed and a rotor shaft speed. In some examples, the inverter is a 3-phase inverter powered by a DC power signal from a DC bus.

In an example, a system includes one or more processors and memory, the memory storing instructions that, when executed by the processor, cause the processor to determine a rotor voltage and a rotor current associated with an excitation signal that is transmitted from a stator of a motor to a set of rotor windings at a rotor of the motor via a high frequency contactless transformer, where the excitation signal produces a rotating magnetic flux at the rotor. The instructions further cause the processor to determine a rotor flux magnitude estimate and a rotor flux angle estimate based on the rotor voltage and the rotor current. The instructions also cause the processor to determine an inverter control signal operable to generate the excitation signal based at least partially on the rotor flux magnitude estimate and the rotor flux angle estimate, where the inverter control signal is used to generate the excitation signal.

In some examples, the instructions cause the processor to determine a stator voltage and a stator current associated with an AC power signal transmitted from an AC bus to a set of stator windings, determine a stator flux magnitude estimate and a stator flux angle estimate based on the stator voltage and the stator current, and determine a phase angle difference based on the rotor flux angle estimate, a rotor shaft angle, and the stator flux angle estimate, where the inverter control signal is further based at least partially on the phase angle difference.

In some examples, the instructions cause the processor to determine a torque estimation based on the rotor flux magnitude estimate, the stator flux magnitude estimate, and the phase angle difference, where the inverter control signal is further based at least partially on the torque estimation. In some examples, the instructions cause the processor to determine a flux lookup value based on a difference between a reference rotor flux magnitude and the rotor flux magnitude estimate, determine a torque lookup value based on a difference between a reference torque and the torque estimation, and determine a sector lookup value based on a reference rotor flux angle, where the inverter control signal is determined by using a lookup table with the flux lookup value, the torque lookup value, and the sector lookup value as inputs.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Figure 1:
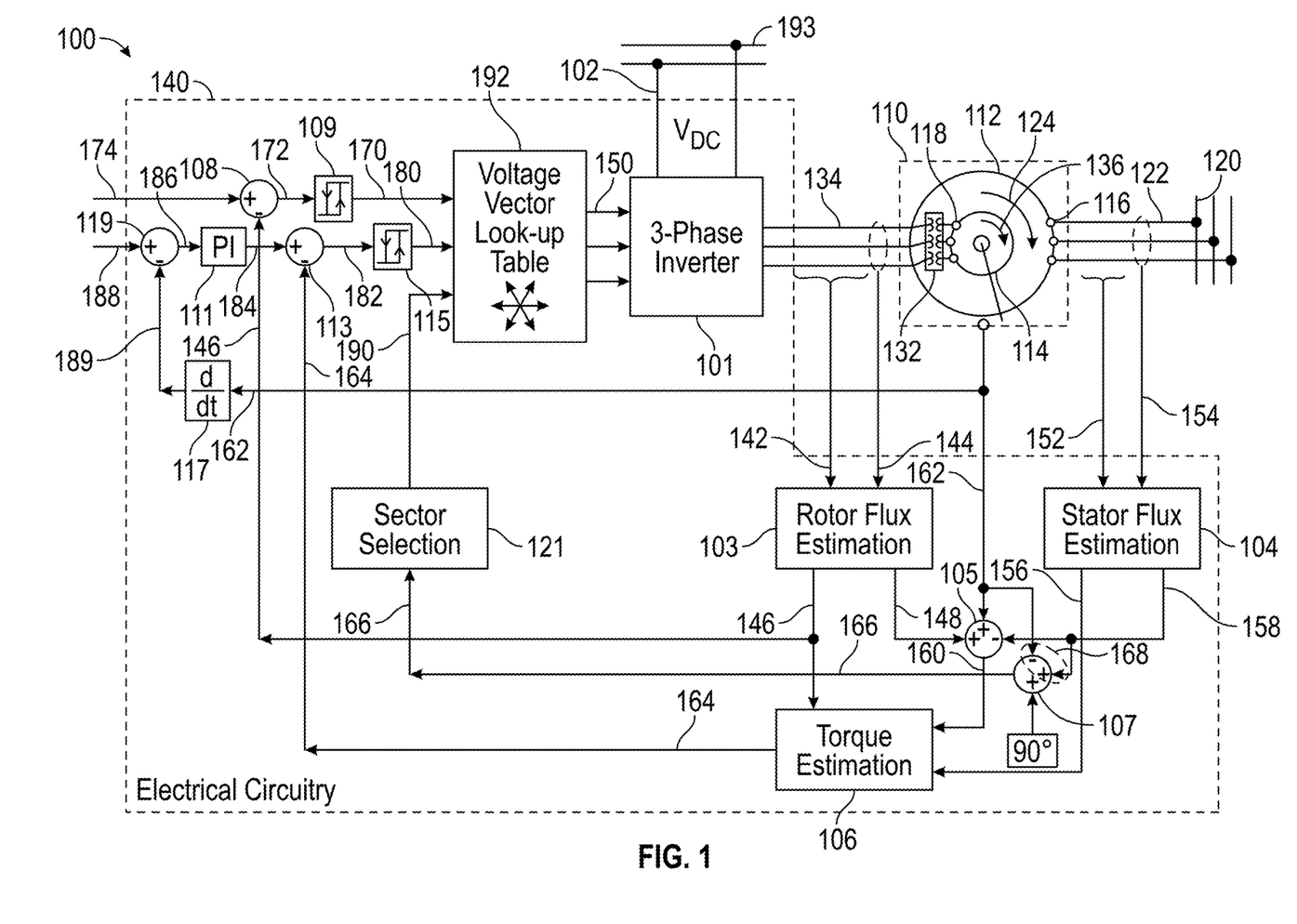
FIG. 1 is a block diagram depicting an example of a system for VFIS motor control.

Referring to FIG. 1, an example of a system 100 for VFIS motor control is depicted. The system 100 may include a motor 110, an AC bus 120, and electrical circuitry 140 for controlling the motor 110. The motor 110 may be a VFIS motor and may include a set of stator windings 116 and a set of rotor windings 118. The AC bus 120 may be configured to transmit an AC power signal 122 to the set of stator windings 116. In passing through the set of stator windings 116, the AC power signal 122 may produce a first rotating magnetic flux 124 at the set of stator windings 116. A high frequency contactless transformer 132 may be configured to transmit an excitation signal 134 from the stator 112 to the rotor 114. The excitation signal 134 may be received at the set of rotor windings 118 and may produce a second rotating magnetic flux 136 at the rotor 114. The second rotating magnetic flux 136 may add to or offset the first rotating magnetic flux 124. In that way, the speed of the motor 110 may be controlled by controlling a magnitude, frequency, and phase of the excitation signal 134 while the AC power signal 122 may be applied to the motor 110 without modification.

Non-limiting examples of VFIS motors that may be used with this disclosure are described in U.S. Pat. No. 10,547,269, issued on Jan. 28, 2020, and entitled "Variable Frequency Independent Speed Motor", and in U.S. patent application Ser. No. 16/215,229, filed on Dec. 10, 2018, and entitled "Negative-Slope Voltage-Frequency for Starting a Variable Frequency Independent Speed Motor and Speed Control," the contents of each of which are incorporated by reference herein in their entirety.

The AC bus 120 may be a multiphase AC bus. In some examples, the AC bus 120 may be a three-phase bus configured to provide electrical power to a vehicle, such as an aircraft. For example, the motor 110 may drive a propulsion system of an aircraft and the AC bus 120 may be part of a propulsion power distribution system within the aircraft. In some examples, the AC bus 120 may be an industrial AC power source, such as may be provided from a power distribution grid for manufacturing or other industrial processes.

The electrical circuitry 140 may include various modules for performing different calculation functions. For example, the electrical circuitry 140 may include a rotor flux estimation module 103, a stator flux estimation module 104, a torque estimation module 106, a flux hysteresis comparator 109, a proportional-integral controller 111, a torque hysteresis comparator 115, a derivative module 117, and a sector selection module 121. Each of these modules may be implemented in digital and/or analog hardware logic circuitry, or as processors such as microprocessors and/or microcontrollers. Further, two or more of the modules described in FIG. 1 may be combined with each other to provide a more compact and efficient system. Examples where one or more modules are implemented using processors are further described herein.

The electrical circuitry 140 may further include addition-subtraction circuitry such as a first addition-subtraction module 105, a second addition-subtraction module 107, a third addition-subtraction module 108, a fourth addition-subtraction module 113, and a fifth addition-subtraction module 119. Although depicted functionally in FIG. 1, these addition-subtraction modules may be implemented in digital and/or analog hardware logic circuitry and/or as one or more processors.

During operation, a rotor voltage 142 and a rotor current 144 associated with the excitation signal 134 may be determined (e.g., measured). The rotor flux estimation module 103 may receive the rotor voltage 142 and the rotor current 144 and determine a rotor flux magnitude estimate 146 and a rotor flux angle estimate 148 based on the rotor voltage 142 and the rotor current 144. In mathematical terms, the rotor flux magnitude estimate 146 and the rotor flux angle estimate 148 may be modeled as follows:

$$\Psi_R = |\Psi_R| \angle \theta_R = \int (V_R - I_R \cdot R_R) dt$$

where $\Psi_R$ is a rotor flux vector estimate, $|\Psi_R|$ is the rotor flux magnitude estimate 146, $\theta_R$ is the rotor flux angle estimate 148, $V_R$ is the rotor voltage 142, $I_R$ is the rotor current 144, and $R_R$ is the motor rotor resistance.

The rotor flux magnitude estimate 146 and the rotor flux angle estimate 148 may ultimately be used, along with other elements as described herein, to determine and generate an inverter control signal 150 operable to generate the excitation signal 134. By determining the rotor flux magnitude estimate 146 and the rotor flux angle estimate 148, the system 100 may enable direct torque control methods for the motor 110 in the case where the motor 110 is a VFIS motor. This represents an advantage over typical direct torque control methods that may not estimate any flux magnitude or flux angle associated with a rotor.

The third addition-subtraction module 108 may receive the rotor flux magnitude estimate 146 and may determine a difference 172 between a reference rotor flux magnitude 174 and the rotor flux magnitude estimation 146. The reference rotor flux magnitude 174 may represent a desired or preset rotor flux magnitude output of the motor 110. For example, the reference rotor flux magnitude may be determined based on a user control setting, such as may be set at a control/instrument panel (not shown).

The difference 172 may be received at the flux hysteresis comparator 109. Based on the difference 172, a flux lookup value 170 may be generated. The flux hysteresis comparator 109 may generate the flux lookup value 170 by "swinging" to a positive value if the difference 172 is greater than a threshold or swinging to a negative value if the difference 172 is less than a threshold.

On the stator side, a stator voltage 152 and a stator current 154 associated with the AC power signal 122 may also be determined (e.g., measured) and received at the stator flux estimation module 104. The stator flux estimation module 104 may determine a stator flux magnitude estimate 156 and a stator flux angle estimate 158 based on the stator voltage 152 and the stator current 154. In mathematical terms, the stator flux magnitude estimate 156 and the stator flux angle estimate 158 may be modeled as follows:

$$\Psi_S = |\Psi_S| \angle \theta_S = \int (V_S - I_S \cdot R_S) dt$$

where $\Psi_S$ is a stator flux vector estimate, $|\Psi_S|$ is the stator flux magnitude estimate 156, $\theta_S$ is the stator flux angle estimate 158, $V_S$ is the stator voltage 152, $I_S$ is the stator current 154, and $R_S$ is the motor stator resistance.

The first addition-subtraction module 105 may determine a phase angle difference 160 based on the rotor flux angle estimate 148, a rotor shaft angle 162 associated with the motor 110, and the stator flux angle estimate 158.

The rotor flux magnitude estimate 146, the stator flux magnitude estimate 156, and the phase angle difference 160 may be received at the torque estimation module 106 from which a torque estimation 164 may be determined as follows:

$$T_{EST} = K \cdot |\Psi_R| \cdot |\Psi_S| \cdot \theta_{RS}$$

where $T_{EST}$ is the torque estimation 164 and $\theta_{RS}$ is the phase angle difference 160, and K is a motor specific constant that can be experimentally determined and/or determined by motor parameters.

The fourth addition-subtraction module 113 may receive a reference torque 184 and the torque estimation 164 and may determine a difference 182 between them. The reference torque 184 may represent a desired or preset torque output from the motor 110.

The difference 182 may be received at the torque hysteresis comparator 115. Based on the difference 182, a torque lookup value 180 may be generated. The torque hysteresis comparator 115 may generate the torque lookup value 180 by "swinging" to a positive value if the difference 182 is greater than a predetermined threshold or swinging to a negative value if the difference 182 is less than a predetermined threshold.

The reference torque 184 may be calculated by the electrical circuitry 140 using the fifth addition-subtraction module 119, the proportional-integral controller 111, and the derivative module 117. As with the reference rotor flux magnitude 174, a reference shaft speed 188 may be determined based on a user control setting. The fifth addition-subtraction module 119 may determine a difference 186 between the reference shaft speed 188 and a rotor shaft speed 189. The rotor shaft speed 189 may be determined by the derivative module 117 based on the rotor shaft angle 162. The proportional-integral controller 111 may then be used to generate the reference torque 184 based on the difference 186 between the reference shaft speed 188 and the rotor shaft speed 189.

The electrical circuitry 140 may also be configured to determine a sector lookup value 190. The second addition-subtraction module 107, may be configured to determine a reference rotor flux angle 166 by offsetting a difference 168 between the stator flux angle estimate 158 and the rotor shaft angle 162 by 90 degrees. The sector selection module 121 may then determine the sector lookup value based on the reference rotor flux angle 166. For example, the sector selection module 121 may map a set of rotor flux angles to a set of sectors typically used for direct torque control methods as understood by persons of ordinary skill in the art having the benefit of this disclosure.

The flux lookup value 170, the torque lookup value 180, and the sector lookup value 190 may be used to determine the inverter control signal 150. For example, each of these values may be binary values and may be input into, or otherwise mapped using, the lookup table 192. Based on the results, eight possible inverter voltage vectors may be encoded in the inverter control signal 150. The voltage vectors may be based on the state of the system 100 at any given moment. As the lookup values 170, 180, 190 change over time, the inverter control signal 150 will change also. The inverter control signal 150 may then be used by a 3-phase inverter 101 to generate the excitation signal 134. The 3-phase inverter 101 may be powered by a DC bus 193. The excitation signal 134 may be continuously monitored by the rotor flux estimation module 103 to provide continuous feedback usable by direct torque control processes. The 3-phase inverter 101 may be powered by a direct current (DC) power signal 102, which may be received from a separate power source, based on a rectified current from the AC bus 120, or some combination thereof.

An advantage of the system 100 is that by determining the rotor flux magnitude estimate 146 and the rotor flux angle estimate 148, a direct torque control method may be applied to a VFIS motor while taking into account the excitation signal 134. Other advantages may exist.

Figure 2:
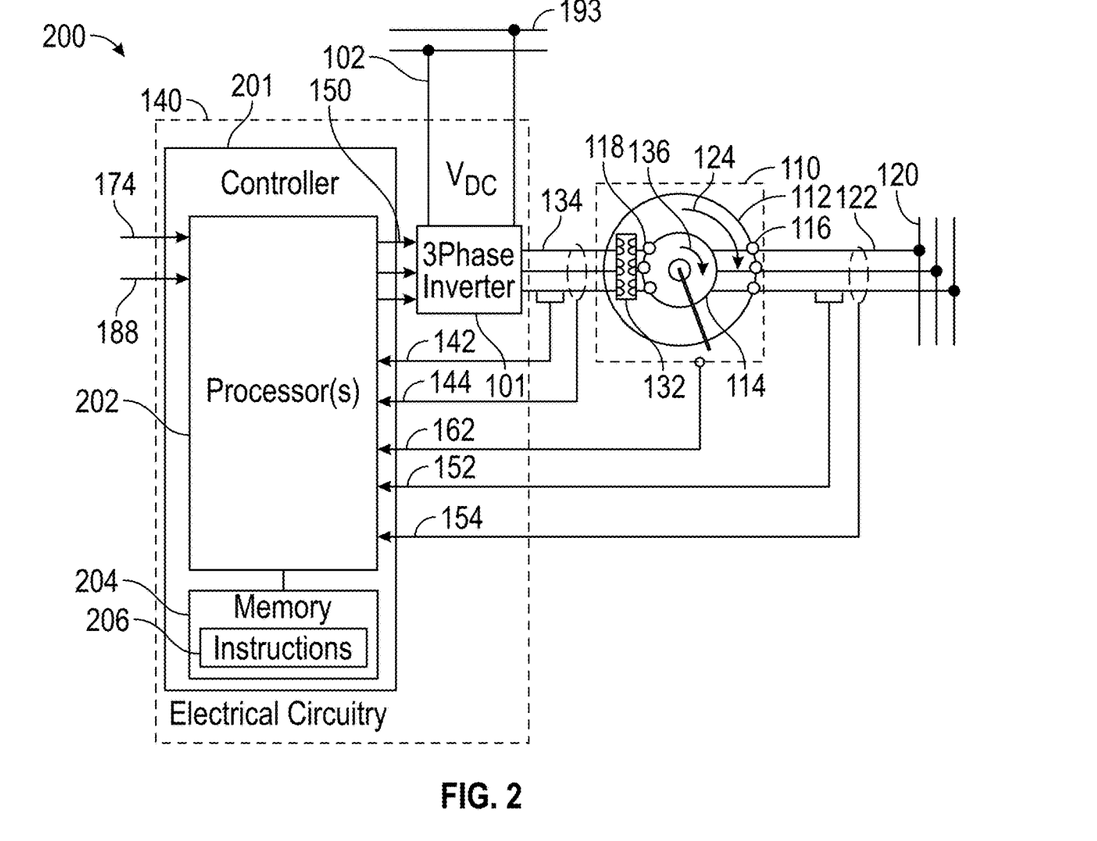
FIG. 2 is a block diagram depicting another example of a system for VFIS motor control.

Referring to FIG. 2, an example of a system 200 for VFIS motor control is depicted. As with the system 100, the system 200 may include a motor 110 and an AC bus 120, where the motor 110 may include a set of stator windings 116 and a set of rotor windings 118, where the AC bus 120 may be configured to transmit an AC power signal 122 to the set of stator windings 116 to produce a first rotating magnetic flux 124, and where a high frequency contactless transformer 132 may be configured to transmit an excitation signal 134 from the stator 112 to the rotor 114 to produce a second rotating magnetic flux 136 at the rotor 114.

The system 200 may further include electrical circuitry 140. In the system 200, the electrical circuitry 140 may include a controller 201. In the context of FIG. 2, the term "controller" may include any type of physical and structural electrical control system that can be used to generate the inverter control signal 150. The controller 201 may include one or more processor 202 and memory 204.

The one or more processors 202 may include a microcontroller, a central processing unit (CPU), a graphical processing unit (GPU), a digital signal processor (DSP), a peripheral interface controller (PIC), another type of microprocessor, and/or combinations thereof. Further, the one or more processors 202 may be implemented as integrated circuits, complementary metal-oxide-semiconductor (CMOS) field-effect-transistor (MOSFET) circuits, very-large-scale-integrated (VLSI) circuits, field-programmable gate arrays (FPGAs), application-specific integrated circuit (ASICs), combinations of logic gate circuitry, other types of digital or analog electrical design components, or combinations thereof. The memory 204 may include memory devices such as random-access memory (RAM), read-only memory (ROM), magnetic disk memory, optical disk memory, flash memory, another type of memory capable of storing data and processor instructions, or the like, or combinations thereof.

The memory 204 may store processor executable instructions 206 that, when executed by the one or more processors 202, cause the one or more processors 202 to perform the operations described herein. As a non-limiting example, the instructions 206 may cause the one or more processors 202 to determine (measure) a rotor voltage 142, a rotor current 144, a rotor shaft angle 162, a stator voltage 152, and a stator current 154. The one or more processors 202 may also receive a reference rotor flux magnitude 174 and a reference shaft speed 188. Using these values, the instructions 206 may cause the one or more processors 202 to determine a rotor flux magnitude estimate and a rotor flux angle estimate, determine a stator flux magnitude estimate and a stator flux angle estimate, determine a phase angle difference, determine a torque estimation, determine a reference rotor flux angle, determine a flux lookup value, determine a torque lookup value, determine a sector lookup value, and generate an inverter control signal 150 as described herein. The inverter control signal 150 may be sent to a 3-phase inverter 101 to generate the excitation signal 134.

Although FIG. 2 depicts each of the functional modules (shown in FIG. 1) of the electrical circuitry 140 (except the 3-phase inverter 101) as being performed by the processor 202, one or more modules (such as the proportional-integral controller 111 and the derivative module 117) may be separate and distinct from the one or more processors 202. For example, combinations of processors and logic modules may be used to implement the electrical circuitry 140.

Figure 3:
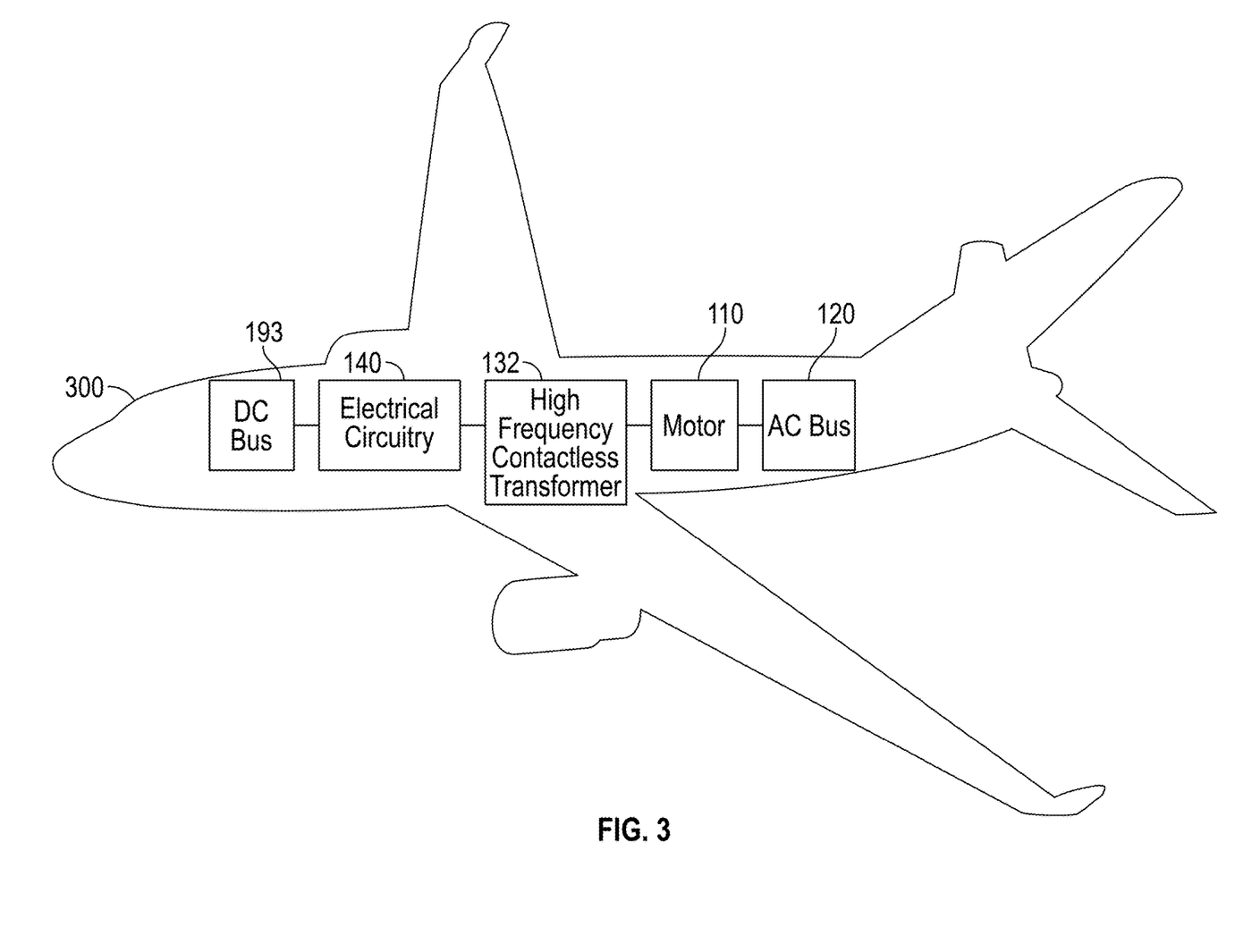
FIG. 3 is a diagram depicting an example of a vehicle including a system for VFIS motor control.

Referring to FIG. 3, an example of a vehicle 300 including a system for VFIS motor control is depicted. For example, the vehicle 300 may be an aircraft. However, the vehicle 300 is not limited only to aircraft. The vehicle 300 may include the electrical circuitry 140, the high frequency contactless transformer 132, the motor 110, and the AC bus 120. The electrical circuitry 140 may include the rotor flux estimation module 103, which may enable a direct torque control process to be used to control the motor 110.

Figure 4:
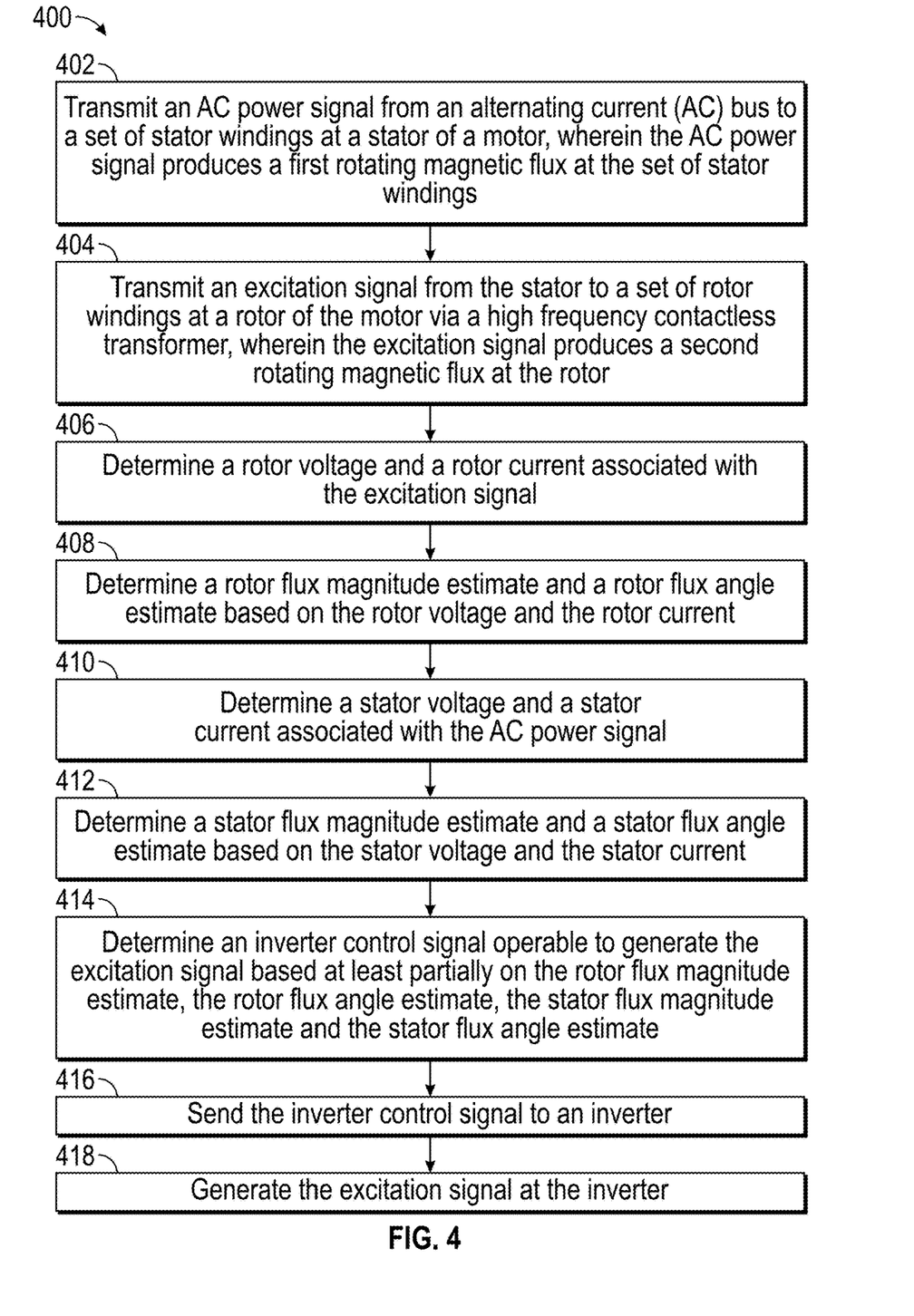
FIG. 4 is a flow diagram depicting an example of a method for VFIS motor control.

Referring to FIG. 4, an example of a method 400 for VFIS motor control is depicted. The method 400 may include transmitting an AC power signal from an AC bus to a set of stator windings at a stator of a motor, where the AC power signal produces a first rotating magnetic flux at the set of stator windings, at 402. For example, the AC power signal 122 may be transmitted to the set of stator windings 116 to produce the first rotating magnetic flux 124.

The method 400 may further include transmitting an excitation signal from the stator to a set of rotor windings at a rotor of the motor via a high frequency contactless transformer, where the excitation signal produces a second rotating magnetic flux at the rotor, at 404. For example, the excitation signal 134 may be transmitted to the set of rotor windings 118 via the high frequency contactless transformer 132 to produce the second rotating magnetic flux 136.

The method 400 may also include determining a rotor voltage and a rotor current associated with the excitation signal, at 406. For example, the rotor flux estimation module 103 may determine, by measuring, the rotor voltage 142 and the rotor current 144.

The method 400 may include determining a rotor flux magnitude estimate and a rotor flux angle estimate based on the rotor voltage and the rotor current, at 408. For example, the rotor flux estimation module 103 may determine the rotor flux magnitude estimate 146 and the rotor flux angle estimate 148.

The method 400 may include determining a stator voltage and a stator current associated with the AC power signal, at 410. For example, the stator voltage 152 and the stator current 154 may be measured and received at the stator flux estimation module 104.

The method 400 may further include determining a stator flux magnitude estimate and a stator flux angle estimate based on the stator voltage and the stator current, at 412. For example, the stator flux estimation module 104 may determine the stator flux magnitude estimate 156 and the stator flux angle estimate 158.

The method 400 may further include determining an inverter control signal operable to generate the excitation signal based at least partially on the rotor flux magnitude estimate, the rotor flux angle estimate, the stator flux magnitude estimate, and the stator flux angle estimate, at 414. For example, the inverter control signal 150 may be determined based on the lookup table 192 using the flux lookup value 170, the torque lookup value 180, and the sector lookup value 190. As described herein, the lookup values 170, 180, 190 may be at least partially based on the rotor flux magnitude estimate 146, the rotor flux angle estimate 148, the stator flux magnitude estimate 156, and the stator flux angle estimate 158.

The method 400 may also include sending the inverter control signal to an inverter, at 416. For example, the inverter control signal 150 may be sent to the 3-phase inverter 101.

The method 400 may include generating the excitation signal at the inverter, at 418. For example, the 3-phase inverter 101 may generate the excitation signal 134.

Figure 5:
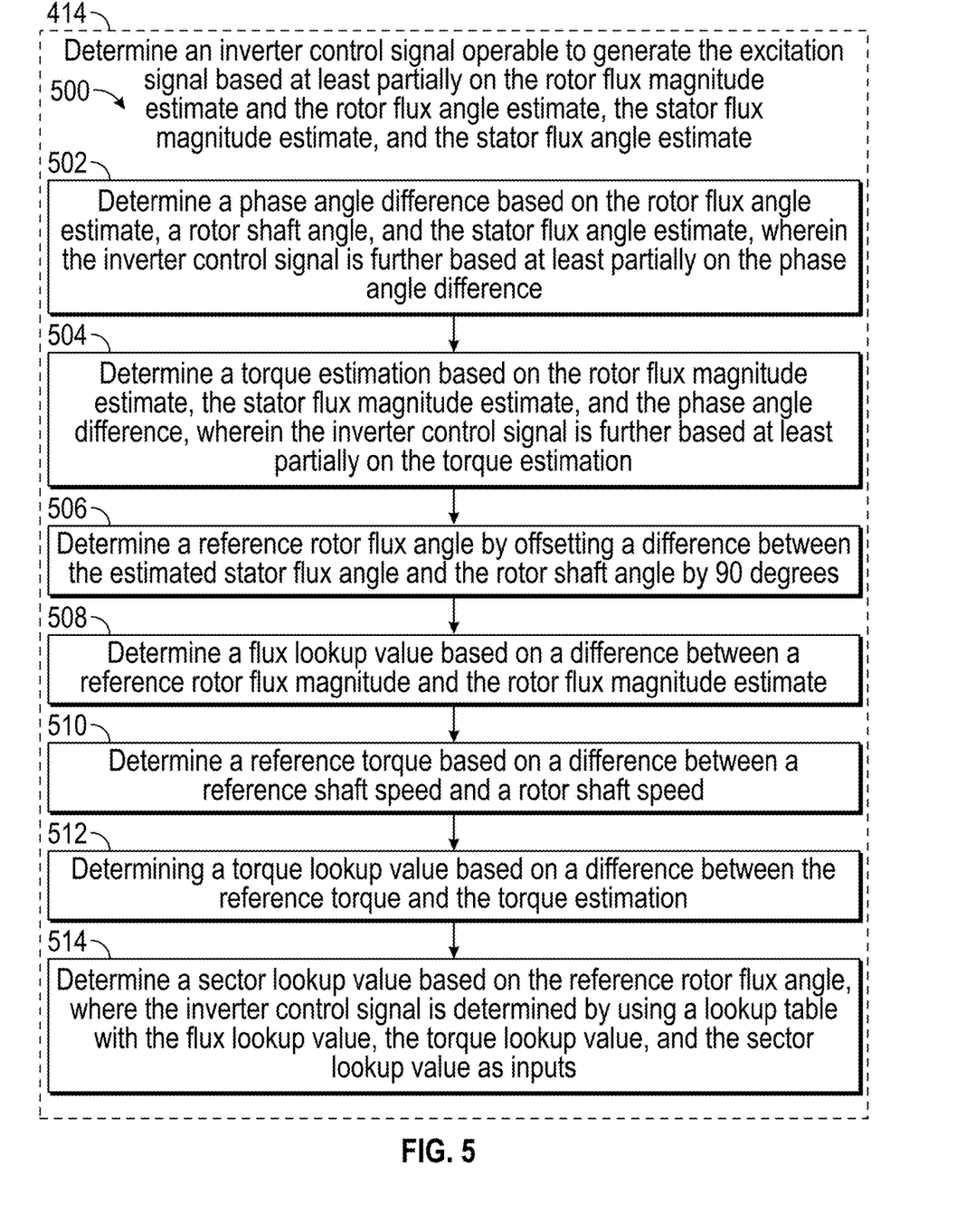
FIG. 5 is a flow diagram depicting an example of a method for VFIS motor control.

Referring to FIG. 5, an example of a method 500 for VFIS motor control is depicted. The method 500 may be included in the operation of determining an inverter control signal operable to generate the excitation signal based at least partially on the rotor flux magnitude estimate, the rotor flux angle estimate, the stator flux magnitude estimate, and the stator flux angle estimate, at 414 of FIG. 4.

The method 500 may include determining a phase angle difference based on the rotor flux angle estimate, a rotor shaft angle, and the stator flux angle estimate, where the inverter control signal is further based at least partially on the phase angle difference, at 502. For example, the phase angle difference 160 may be determined by the first addition-subtraction module 105. The phase angle difference 160 may ultimately be used to calculate the torque lookup value 180 used to generate the inverter control signal 150, as described herein.

The method 500 may further include determining a torque estimation based on the rotor flux magnitude estimate, the stator flux magnitude estimate, and the phase angle difference, where the inverter control signal is further based at least partially on the torque estimation, at 504. For example, the torque estimation module 106 may determine the torque estimation 164, which, like the phase angle difference 160, may ultimately be used in determining the torque lookup value 180 used to generate the inverter control signal 150.

The method 500 may further include determining a reference rotor flux angle by offsetting a difference between the estimated stator flux angle and the rotor shaft angle by 90 degrees, at 506. For example, the reference rotor flux angle 166 may be determined by the second addition-subtraction module 107 based on the estimated stator flux angle estimate 158 and the rotor shaft angle 162.

The method 500 may also include determining a flux lookup value based on a difference between a reference rotor flux magnitude and the rotor flux magnitude estimate, at 508. For example, the flux lookup value 170 may be determined by the flux hysteresis comparator 109 based on the difference 172 between the reference rotor flux magnitude 174 and the rotor flux magnitude estimate 146.

The method 500 may include determining a reference torque based on a difference between a reference shaft speed and a rotor shaft speed, at 510. For example, the reference torque 184 may be determined by the proportional-integral controller 111 based on the difference 186 between the reference shaft speed 188 and the rotor shaft speed 189.

The method 500 may further include determining a torque lookup value based on a difference between the reference torque and the torque estimation, at 512. For example, the torque lookup value 180 may be determined by the torque hysteresis comparator 115 based on the difference 182 between the reference torque 184 and the torque estimation 164.

The method 500 may also include determine a sector lookup value based on the reference rotor flux angle, where the inverter control signal is determined by using a lookup table with the flux lookup value, the torque lookup value, and the sector lookup value as inputs, at 514. For example, the sector lookup value 190 may be determined by the sector selection module 121.

Although various embodiments have been shown and described, the present disclosure is not so limited and will be understood to include all such modifications and variations as would be apparent to one skilled in the art.

What is claimed is:

1. A system comprising:
a motor having a stator, a rotor, a set of stator windings, and a set of rotor windings;
an alternating current (AC) bus configured to transmit an AC power signal to the set of stator windings, wherein the AC power signal produces a first rotating magnetic flux at the set of stator windings;
a high frequency contactless transformer configured to transmit an excitation signal from the stator to the rotor, wherein the excitation signal is received at the set of rotor windings, and wherein the excitation signal produces a second rotating magnetic flux at the rotor; and
electrical circuitry configured to determine a rotor voltage and a rotor current associated with the excitation signal, determine a rotor flux magnitude estimate and a rotor flux angle estimate based on the rotor voltage and the rotor current, and determine an inverter control signal operable to generate the excitation signal based at least partially on the rotor flux magnitude estimate and the rotor flux angle estimate.

2. The system of claim 1, wherein the electrical circuitry is further configured to determine a stator voltage and a stator current associated with the AC power signal, determine a stator flux magnitude estimate and a stator flux angle estimate based on the stator voltage and the stator current, and determine a phase angle difference based on the rotor flux angle estimate, a rotor shaft angle, and the stator flux angle estimate, wherein the inverter control signal is further based at least partially on the phase angle difference.

3. The system of claim 2, wherein the electrical circuitry is further configured to determine a torque estimation based on the rotor flux magnitude estimate, the stator flux magnitude estimate, and the phase angle difference, wherein the inverter control signal is further based at least partially on the torque estimation.

4. The system of claim 3, wherein the electrical circuitry is further configured to determine a reference rotor flux angle by offsetting a difference between the stator flux angle estimate and the rotor shaft angle by 90 degrees, wherein the inverter control signal is further based at least partially on the reference rotor flux angle.

5. The system of claim 4, wherein the electrical circuitry is further configured to determine a flux lookup value based on a difference between a reference rotor flux magnitude and the rotor flux magnitude estimate, determine a torque lookup value based on a difference between a reference torque and the torque estimation, determine a sector lookup value based on the reference rotor flux angle, wherein the inverter control signal is determined by using a lookup table with the flux lookup value, the torque lookup value, and the sector lookup value as inputs.

6. The system of claim 5, wherein the electrical circuitry is further configured to determine the reference torque based on a difference between a reference shaft speed and a rotor shaft speed.

7. The system of claim 1, further comprising a direct current (DC) bus and a 3-phase inverter for generating the excitation signal using a DC power signal from the DC bus.

8. The system of claim 1, wherein the electrical circuitry implements a controller that includes at least one processor and memory, wherein the memory stores instructions that are executable by the at least one processor, wherein determining the rotor flux magnitude estimate and the rotor flux angle estimate, determining a stator flux magnitude estimate and a stator flux angle estimate, determining a phase angle difference, determining a torque estimation, determine a reference rotor flux angle, determining a flux lookup value, determine a torque lookup value, determine a sector lookup value, and determining the inverter control signal operable to generate the excitation signal is performed at the processor.

9. The system of claim 1, wherein the motor, the AC bus, a DC bus, the high frequency contactless transformer, and the electrical circuitry are incorporated into a vehicle.

10. A method comprising:
transmitting an alternating current (AC) power signal from an AC bus to a set of stator windings at a stator of a motor, wherein the AC power signal produces a first rotating magnetic flux at the set of stator windings;
transmitting an excitation signal from the stator to a set of rotor windings at a rotor of the motor via a high frequency contactless transformer, wherein the excitation signal produces a second rotating magnetic flux at the rotor;
determining a rotor voltage and a rotor current associated with the excitation signal;
determining a rotor flux magnitude estimate and a rotor flux angle estimate based on the rotor voltage and the rotor current;
determining an inverter control signal operable to generate the excitation signal based at least partially on the rotor flux magnitude estimate and the rotor flux angle estimate; and
sending the inverter control signal to an inverter; and generating the excitation signal at the inverter.

11. The method of claim 10, further comprising:
determining a stator voltage and a stator current associated with the AC power signal;
determining a stator flux magnitude estimate and a stator flux angle estimate based on the stator voltage and the stator current; and
determining a phase angle difference based on the rotor flux angle estimate, a rotor shaft angle, and the stator flux angle estimate, wherein the inverter control signal is further based at least partially on the phase angle difference.

12. The method of claim 11, further comprising:
determining a torque estimation based on the rotor flux magnitude estimate, the stator flux magnitude estimate, and the phase angle difference, wherein the inverter control signal is further based at least partially on the torque estimation.

13. The method of claim 12, further comprising:
determining a reference rotor flux angle by offsetting a difference between the stator flux angle estimate and the rotor shaft angle by 90 degrees.

14. The method of claim 13, further comprising:
determining a flux lookup value based on a difference between a reference rotor flux magnitude and the rotor flux magnitude estimate;
determining a torque lookup value based on a difference between a reference torque and the torque estimation;
determining a sector lookup value based on the reference rotor flux angle, wherein the inverter control signal is determined by using a lookup table with the flux lookup value, the torque lookup value, and the sector lookup value as inputs.

15. The method of claim 14, further comprising:
determining the reference torque based on a difference between a reference shaft speed and a rotor shaft speed.

16. The method of claim 10, wherein the inverter is a 3-phase inverter powered by a direct current (DC) power signal from a DC bus (193).

17. A system comprising one or more processors and memory, the memory storing instructions that, when executed by the processor, cause the processor to:
determine a rotor voltage and a rotor current associated with an excitation signal that is transmitted from a stator of a motor to a set of rotor windings at a rotor of the motor via a high frequency contactless transformer, wherein the excitation signal produces a rotating magnetic flux at the rotor;
determine a rotor flux magnitude estimate and a rotor flux angle estimate based on the rotor voltage and the rotor current; and
determine an inverter control signal operable to generate the excitation signal based at least partially on the rotor flux magnitude estimate and the rotor flux angle estimate, wherein the inverter control signal is used to generate the excitation signal.

18. The system of claim 17, wherein the instructions further cause the processor to:
determine a stator voltage and a stator current associated with an alternating current (AC) power signal transmitted from an AC bus to a set of stator windings;
determine a stator flux magnitude estimate and a stator flux angle estimate based on the stator voltage and the stator current; and
determine a phase angle difference based on the rotor flux angle estimate, a rotor shaft angle, and the stator flux angle estimate, wherein the inverter control signal is further based at least partially on the phase angle difference.

19. The system of claim 18, wherein the instructions further cause the processor to:
determine a torque estimation based on the rotor flux magnitude estimate, the stator flux magnitude estimate, and the phase angle difference, wherein the inverter control signal is further based at least partially on the torque estimation.

20. The system of claim 19, wherein the instructions further cause the processor to:
determine a flux lookup value based on a difference between a reference rotor flux magnitude and the rotor flux magnitude estimate;
determine a torque lookup value based on a difference between a reference torque and the torque estimation; and
determine a sector lookup value based on a reference rotor flux angle, wherein the inverter control signal is determined by using a lookup table with the flux lookup value, the torque lookup value, and the sector lookup value as inputs.

* * * * *